United States Patent
Park

(12) 
(10) Patent No.: US 6,906,758 B2
(45) Date of Patent: Jun. 14, 2005

(54) COOLING STRUCTURE FOR PROJECTION TELEVISION

(75) Inventor: Sangdon Park, Gumi-si (KR)

(73) Assignee: LG Electronics Inc., Seoul (KR)

( * ) Notice: Subject to any disclaimer, the term of this patent is extended or adjusted under 35 U.S.C. 154(b) by 578 days.

(21) Appl. No.: 10/143,961

(22) Filed: May 14, 2002

(65) Prior Publication Data

US 2002/0171777 A1 Nov. 21, 2002

(30) Foreign Application Priority Data

May 15, 2001 (KR) ........................................ 2001-26440

(51) Int. Cl.[7] ................................................ H04N 5/74
(52) U.S. Cl. ......................... 348/748; 348/744; 353/61; 353/57
(58) Field of Search ................................ 348/748, 744, 348/787, 789, 819; 353/56–58, 60, 61, 52, 119, 74, 75; H04N 5/74

(56) References Cited

U.S. PATENT DOCUMENTS 6,450,646 B1 * 9/2002 Ono et al. ..................... 353/57
6,805,446 B2 * 10/2004 Arai et al. ................... 348/748

* cited by examiner

*Primary Examiner*—Sherrie Hsia
(74) *Attorney, Agent, or Firm*—Fleshner & Kim, LLP

(57) ABSTRACT

Disclosed is a cooling structure for a projection television, which keeps the inside of the projection television clean and effectively cools the heated projection television. The cooling structure for the projection television comprises a heat blocking unit for separating a lamp system generating superheat from the sealed inner space, a cooling fan for forcibly cooling the heat generated by the synthesis system within the sealed inner space, the cooling fan being formed adjacent to the synthesis system, and a radiating unit for exhausting the heat of the inner space to the outside, the radiating unit being formed on the upper part of the housing.

10 Claims, 8 Drawing Sheets

COOLING STRUCTURE FOR PROJECTION TELEVISION

BACKGROUND OF THE INVENTION

1. Field of the Invention

The present invention relates to a cooling structure for a projection television, which properly cools heat generated from the inside of the projection television. More particularly, the present invention relates to a cooling structure for a projection television, which keeps the inside of the projection television clean and effectively cools the heated projection television.

2. Description of the Related Art

As well known to those skilled in the art, a projection television is a kind of picture display station. In the projection television, a strong light is irradiated to a picture formed on a picture display panel such as a LCD, thereby projecting the picture on the screen.

In order to project the picture formed on the picture display panel on the screen, the projection television must comprise a lamp system for irradiating the strong light. However, the strong light is accompanied with heat, thereby shortening the life span of the projection television product.

Further, the strong light irritated from the lamp system is also transmitted to the picture display panel, thereby exerting a bad effect upon the picture display panel, for example, a boiling phenomenon. Herein, the boiling phenomenon denotes the deterioration of the image quality of the screen due to the boiling of the liquid crystal of the picture display panel.

FIG. 1 is a longitudinal sectional view of a cooling structure of a conventional projection television.

As shown in FIG. 1, the conventional projection television comprises an optical engine assembly 7, a screen 1, and a refractive mirror 3. The optical engine assembly 7 includes a lamp system 7a for irradiating a strong light, a synthesis system 7b for generating a picture image to be projected, and a lens system 7 for properly retracting the light including the image. Herein, the light including the image from the optical engine assembly 7C is projected on the screen 1.

Further, the conventional projection television comprises a back cover 2. In combination with the screen 1, the back cover 2 forms a housing of the projection television, thereby protecting elements inside the projection television.

Moreover, the projection television comprises a suction fan 5 and an exhaust fan 6. The suction fan 5 serves to provide cold external air to the inside of the projection television so as to cool the heated projection television. The exhaust fan 6 serves to exhaust the heated air produced in the projection television to the outside.

A dust proof filter 4 is formed on the exterior of the suction fan 5. Impurities such as the dust within the air to be sucked are filtered by the dust proof filter 4, thereby keeping the inside of the projection television clean.

Arrows shown in FIG. 1 illustrate the circulation of the air to cool the projection television. The cold air is sucked from the outside to the inside of the projection television by the suction fan 5, and the internal heated air is exhausted to the outside by the exhaust fan 6, thereby circulating the air within the projection television.

However, the aforementioned cooling structure for the conventional projection television has several problems, as follows.

As the cooling structure is repeatedly used, the dust is accumulated on the dust proof filter. Therefore, the dust proof filter covered with the dust must be frequently replaced with a new one, thereby causing an inconvenience to a user. Furthermore, it is not easy to replace the dust proof filter with a new one.

When the efficiency of the dust proof filter is deteriorated, the dust cannot be perfectly filtered. Therefore, the non-filtered dust is introduced into the projection television and attached to the picture display panel or the screen, thereby deteriorating the image quality of the projection television.

SUMMARY OF THE INVENTION

Therefore, the present invention has been made in view of the above problems, and it is an object of the present invention to provide a cooling structure for a projection television, which has a hermetically sealed structure, thereby preventing the dust from being introduced into the inside of the projection television, and comprises radiating holes formed on the upper part of the projection television, thereby exhausting the heat generated in the sealed structure to the outside.

In accordance with one aspect of the present invention, the above and other objects can be accomplished by the provision of a cooling structure for a projection television. The cooling structure for the projection television comprises a screen, a housing, and a back cover, which are assembled, thereby forming an inner space, an optical engine assembly including a lamp system, a synthesis system, and a lens system, a heat blocking unit including heat blocking ribs and heat blocking plates, the heat blocking ribs and the heat blocking plates contacting the perimeter of the lamp system, thereby separating the lamp system from the inner space, a sealing frame connected to the heat blocking unit, thereby forming a diaphragm for sealing the inner space in combination with the heat blocking unit, a cooling fan for cooling the synthesis system and the lens system, and a radiating unit including radiating holes for exhausting the heat of the inner space to the outside and a heat sink for covering the radiating holes and for contacting the air of inner space, the radiating holes being formed on the housing and the heat sink being thermal conductive.

In this cooling structure for the television, the dust within the sealed inner space is not introduced into the synthesis system, thereby preventing the deterioration of the quality of the projection television.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
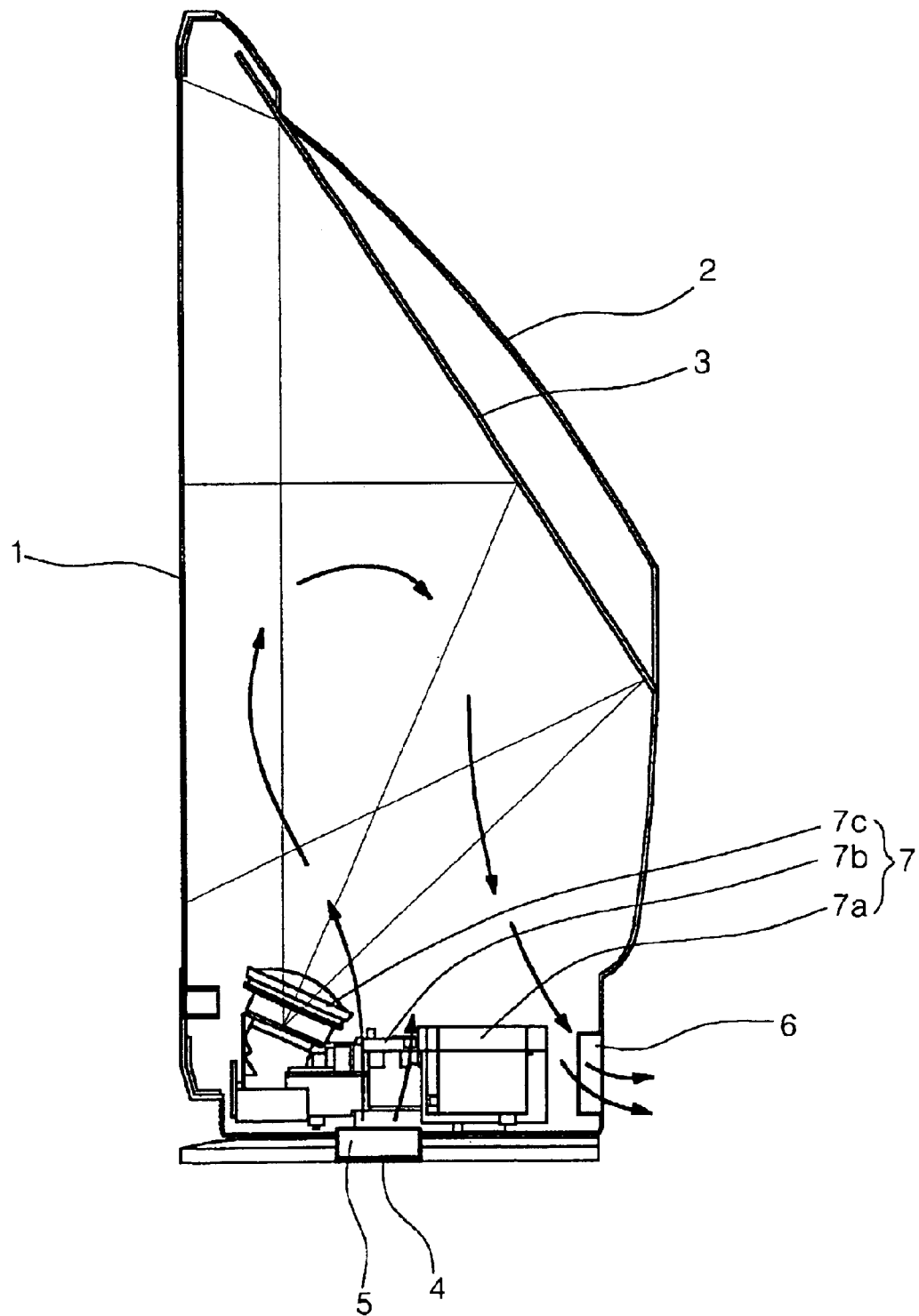
FIG. 1 is a longitudinal sectional view of a cooling structure for a conventional projection television.
Figure 2:
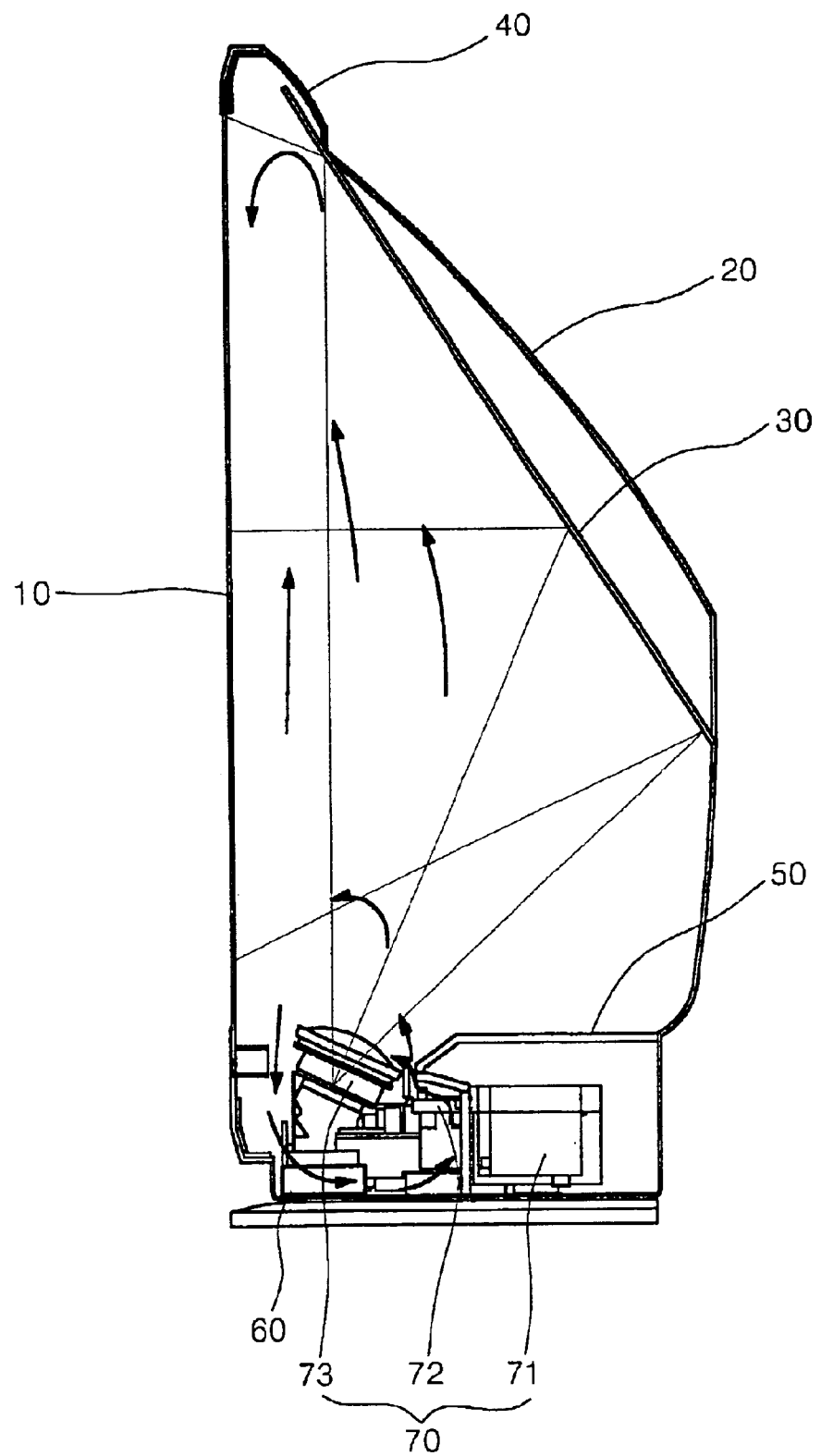
FIG. 2 is a longitudinal sectional view of a cooling structure for a projection television in accordance with a first embodiment of the present invention.

FIG. 2 is a longitudinal sectional view of a cooling structure for a projection television in accordance with a first embodiment of the present invention.

As shown in FIG. 2, the projection television comprises an optical engine assembly 70 including a lamp system 71, a synthesis system 72, and a lens system 73, a reflective mirror 30, and a screen 10. The optical engine assembly 70 irradiates a strong light including a picture signal. The reflective mirror 30 serves to reflect the light irradiated by the optical engine assembly 70. The light reflected by the reflection mirror 30 is projected onto the screen 10.

In order to properly cool the heat generated by the projection television during operation, the projection television of the present invention further comprises a heat blocking unit 50, a cooling fan 60, and a heat-radiating unit 40 as cooling elements. The heat blocking unit 50 serves to separate the lamp system 71 from a hermetically sealed inner space, thereby preventing the projection television from being damaged by the heat generated by the lamp system 71. The cooling fan 60 circulates the air inside of the projection television, thereby achieving the cooling of the hermetically sealed inner space of the projection television. The heat-radiating unit 40 serves to exhaust the heat of the hermetically sealed inner space to the outside.

Hereinafter, a cooling system in accordance with the aforementioned cooling structure for the projection television is described in detail. Since the heat generated by the lamp system 71 of the optical engine assembly 70 is cut off by the heat-blocking unit 50, the heat generated by the lamp system 71 does not affect the hermetically sealed inner space of the projection television.

The weak heat generated by the synthesis system 72 and the lens system 73 of the optical engine assembly 70 is cooled down by the forced-air circulation of the cooling fan 60. The cooled air is transmitted to the hermetically sealed inner space. Then, the transmitted air is exhausted to the outside through the heat-radiating unit 40, which is installed on the top of the projection television.

The reason why the heat-radiating unit 40 is installed on the top of the projection television is that the air heated by the heat generated in the hermetically sealed inner space of the projection television naturally ascends by convection.

Preferably, the lamp system 71 comprises a separate cooling fan, thereby being cooled down itself.

Figure 3:
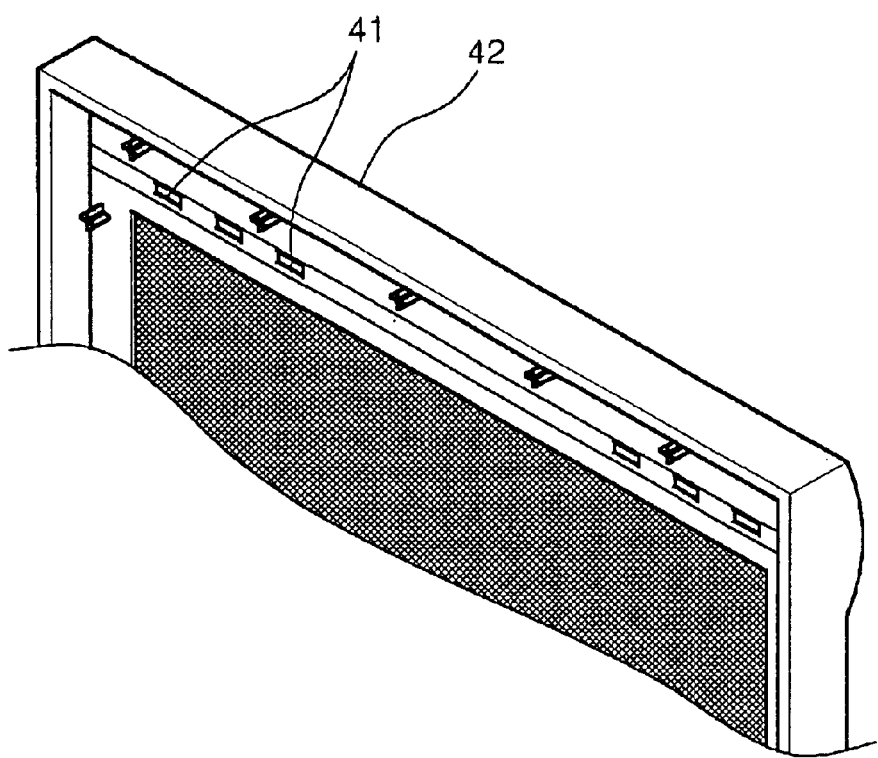
FIG. 3 is a partial perspective view of a radiating unit of the projection television in accordance with the first embodiment of the present invention.

FIG. 3 shows the heat radiating unit of the projection television in accordance with the first embodiment of the present invention.

As shown in FIG. 3, the heat radiating unit of the projection television comprises a heat sink 42 and radiating holes 41. The heat sink 42 is installed on the top of the projection television and contacts the external air. The radiating holes 41 are formed on a housing of the projection television. Thereby, the heated air of the hermetically sealed inner space ascends and directly contacts the heat sink 42.

Preferably, the heat sink 42 is made of aluminum (Al) with an excellent thermal conductivity so as to more easily and to effectively exhaust the heat to the outside.

The radiating degree of the heat generated by the hermetically sealed inner space of the projection television can be controlled by adjusting the size and the number of the radiating holes 41.

Figure 4:
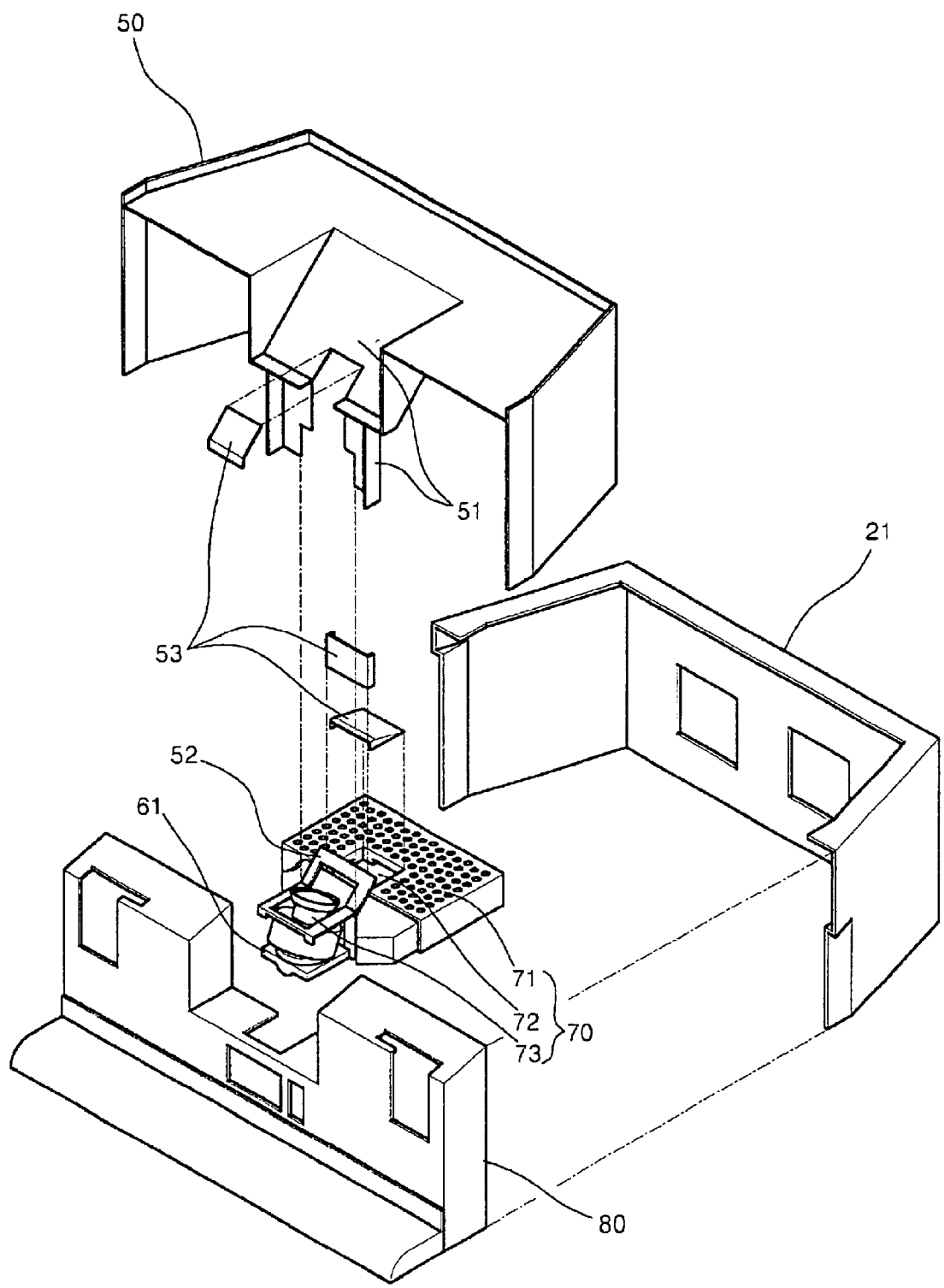
FIG. 4 is an exploded perspective view of a lower part of the projection television in accordance with the first embodiment of the present invention.

FIG. 4 is an exploded perspective view of a lower part of the projection television in accordance with the first embodiment of the present invention.

As shown in FIG. 4, the lower part of the projection television comprises a lower back cover 21 for forming the housing, the optical engine assembly 70 including the lamp system 71, the synthesis system 72, and the lens system 73, and irradiating the light including the image signal, the heat blocking unit 50 for protecting the elements within the projection television from the heat generated by the lamp system 71, and a sealing frame 80. Herein, the sealing frame 80 is installed on the front of the heat-blocking unit 50, thereby hermetically sealing the inner space of the projection television.

Heat blocking ribs 51 are interposed between the synthesis system 72 and the lamp system 71. The heat blocking ribs 51 prevent the hermetically sealed inner space of the projection television from being damaged by the heat generated by the lamp system 71. A plurality of heat blocking plates 53 are formed on the heat-blocking unit 50. The heat blocking plates 53 serve to guide the air, which is blasted by a sirocco fan 61 and cools the synthesis system 73, to the hermetically sealed inner space of the projection television, and to prevent the heat generated by the lamp system 71 from being transmitted to the hermetically sealed inner space of the projection television.

A lens system cover 52 for exhausting the air passing through the synthesis system 72 is formed above the synthesis system 72. The lens system cover 52 serves to prevent the impurities of the sealed inner space such as dust from being introduced into the synthesis system 72. Also, the aforementioned heat blocking plates 53 serve to prevent the inflow of impurities.

Hereinafter, the function of the cooling structure of the projection television is described in detail.

The optical engine assembly 70 comprises the lamp system 71, the synthesis system 72, and the lens system 73.

The lamp system 71 irradiates the strong light. The heat is generated by the lamp system 71. Therefore, the lamp system 71 is separated from the other elements of the optical engine assembly 70, i.e., the synthesis system 72 and the lens system 73, in order to prevent the heat generated by the lamp system 71 from being introduced into the hermetically sealed inner space of the projection television.

The sirocco fan 61 is installed beneath the lens system 73, thereby cooling the picture display panel formed on the synthesis system 72.

Preferably, a flow hole (not shown) is formed beneath the synthesis system 72, thereby introducing the air of the hermetically sealed inner space, which is blown by the sirocco fan 61, into the lower surface of the synthesis system 72.

Then, the air, which cools the synthesis system 72, is guided by the heat blocking plates 53, and exhausted into the inside of the projection television or used to cool the lens system 73.

The superheat generated by the lamp system 71 does not affect the inside of the projection television because of the heat blocking unit 50, particularly by the heat blocking ribs 51 and the heat blocking plates 53.

Figure 5:
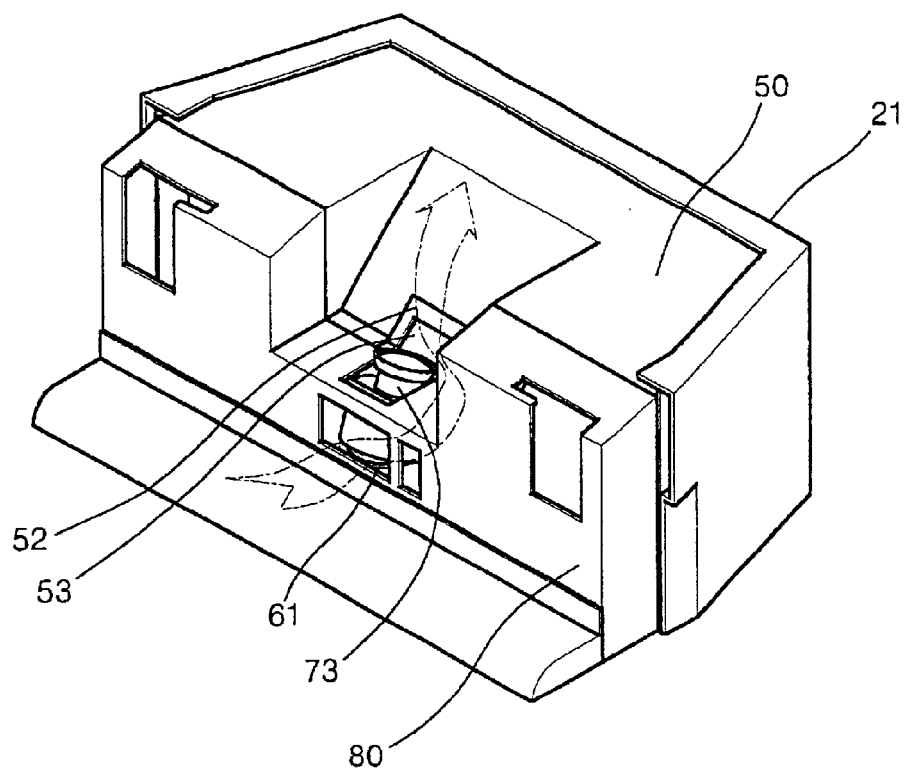
FIG. 5 is a combined perspective view of the lower part of the projection television in accordance with the first embodiment of the present invention.

FIG. 5 is a combined perspective view of the lower part of the projection television in accordance with the first embodiment of the present invention.

As shown in FIG. 5, the lens system 73 of the optical engine assembly 70 is exposed to the heat blocking ribs 51 of the heat-blocking unit 50. The synthesis system 72 and the lamp system 71 of the optical engine assembly 70 are enclosed by the heat-blocking unit 50.

Particularly, the lamp system 71 of the optical engine assembly 70 is separated from the synthesis system 72 and the lens system 73 by the heat blocking ribs (51 of FIG. 4) and the heat blocking plates 52 of the heat blocking unit 50, so that the heat generated by the lamp system 71 is not transmitted to the synthesis system 72 and the lens system 70.

The sirocco fan 61 is formed beneath the lens system 73, thereby forcibly blowing the air to the lower side of the synthesis system 72 and cooling the synthesis system 72.

Particularly, the sirocco fan 61 cools the picture display panel of the synthesis system 72, which is sensitive to the heat, thereby preventing the boiling phenomenon caused by the use of the cooling structure of the projection television for a long time.

Hereinafter, circulation of air through the aforementioned cooling structure for the projection television using the sirocco fan 61 is described in detail.

Figure 6:
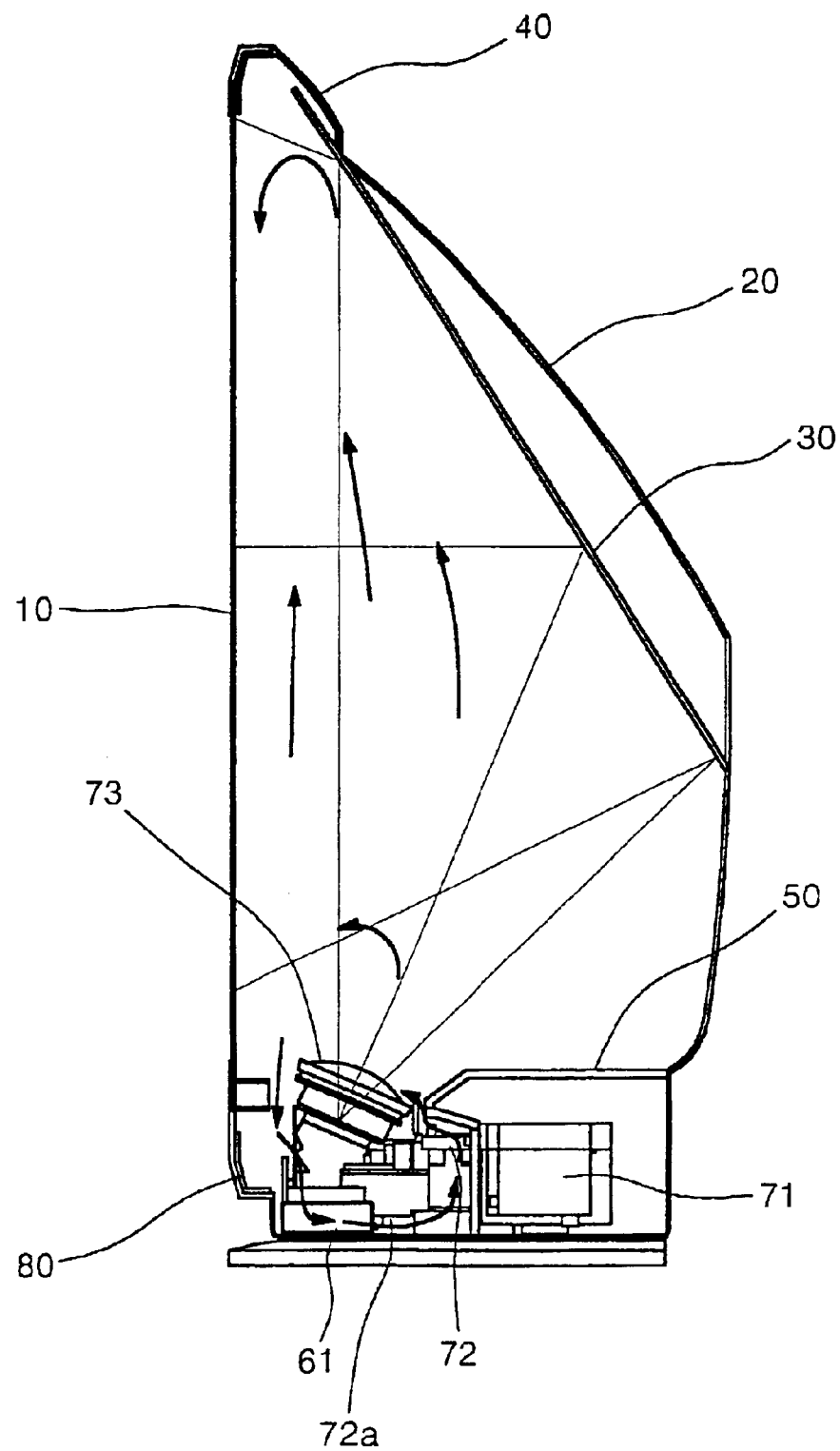
FIG. 6 is a longitudinal sectional view of the projection television in accordance with the first embodiment of the present invention.

FIG. 6 is a longitudinal sectional view of the projection television in accordance with the first embodiment of the present invention.

As show in FIG. 6, the sirocco fan 61 is formed beneath the optical engine assembly 70, thereby circulating air. The sirocco fan 61 generates the forced flow of the air within the hermetically sealed inner space of the projection television.

First, the cold air is introduced from the upper side into the sirocco fan 61. The air passing through the sirocco fan 61 is introduced into the synthesis system 72 via the flow hole 72a.

The air passing through the flow hole 72a is blocked by the heat blocking ribs 51, thereby changing the direction of the airflow toward the top and cooling the synthesis system 72.

After cooling the synthesis system 72, the air is exhausted into the sealed inner space. Otherwise, the direction of the airflow is again changed by plural air blocking plates 53, thereby cooling the lens system 73 and being exhausted into the sealed inner space.

As described above, after cooling the synthesis system 72, the heated air, which is exhausted into the sealed inner space, ascends by the difference of the density of the air within the sealed inner space. The ascending heated air is cooled down by contacting the heat sink (42 of FIG. 3) through the radiating holes (41 of FIG. 3).

Then, the cooled air descends and is again introduced into the sirocco fan 61, thereby repeating the aforementioned cooling cycle of the sealed inner space of the projection television.

The lamp system 71 of the optical engine assembly 70 is separated from the sealed inner space by the heat blocking ribs (51 of FIG. 4) and the heat blocking plates 53, thereby preventing the heat generated by the lamp system 71 from being introduced into the sealed inner space.

Therefore, preferably, a cooling fan (not shown) for cooling the lamp system 71 is formed.

Further, preferably, a radiating unit (not shown) is formed on the lower back cover (21 of FIG. 4). The radiating unit comprises radiating holes (not shown) for exhausting the heat generated by the lamp system 71 to the outside, and a heat sink (not shown), which is made of material with an excellent thermal conductivity. Herein, the heat sink serves to prevent the external air from being introduced into the lamp system 71 and to exhaust the heated air to the outside by contacting the heated air.

Figure 7:
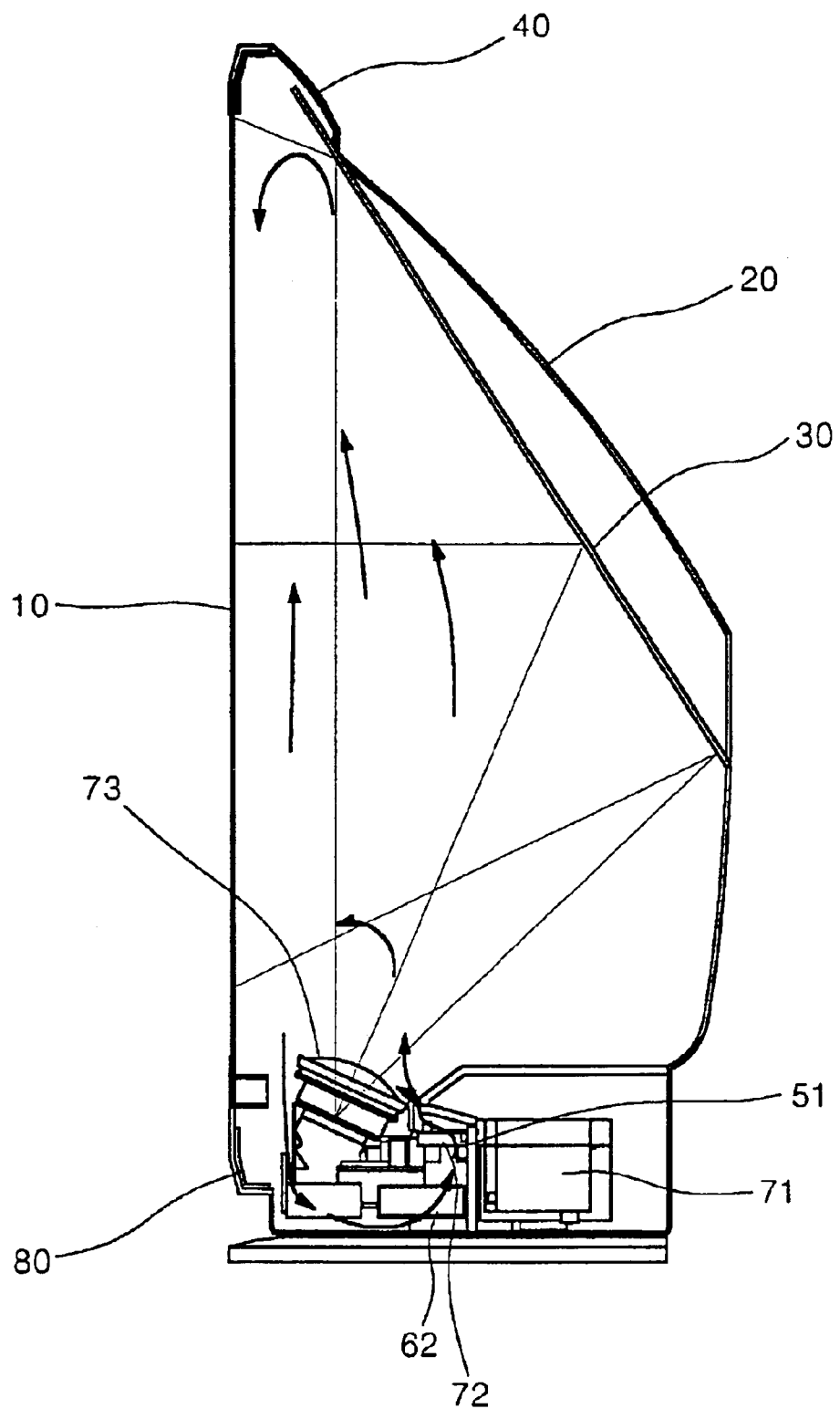
FIG. 7 is a longitudinal sectional view of a projection television in accordance with a second embodiment of the present invention.

FIG. 7 is a longitudinal sectional view of a projection television in accordance with a second embodiment of the present invention.

With reference to FIG. 7, the projection television of the second embodiment of the present invention has a similar configuration to the projection television of the first embodiment, except for the cooling fan. That is, the cooling fan of the second embodiment differs from the cooling fan of the first embodiment according to the location of the cooling fan and the air circulation direction.

Instead of the sirocco fan (61 of FIG. 6) of the first embodiment, the projection television of the second embodiment of the present invention comprises a radial fan 62. The radial fan 62 is not formed beneath the lens system 73 but is formed beneath the synthesis system 72.

Since the radial fan 62 is installed beneath the synthesis system 72, the air is directly blown from the upper side to the lower side of the synthesis system 72. Therefore, compared with the first embodiment, the synthesis system 72 of the second embodiment of the present invention is more quickly cooled.

Arrows shown in FIG. 7 illustrate the air circulation within the projection television.

Figure 8:
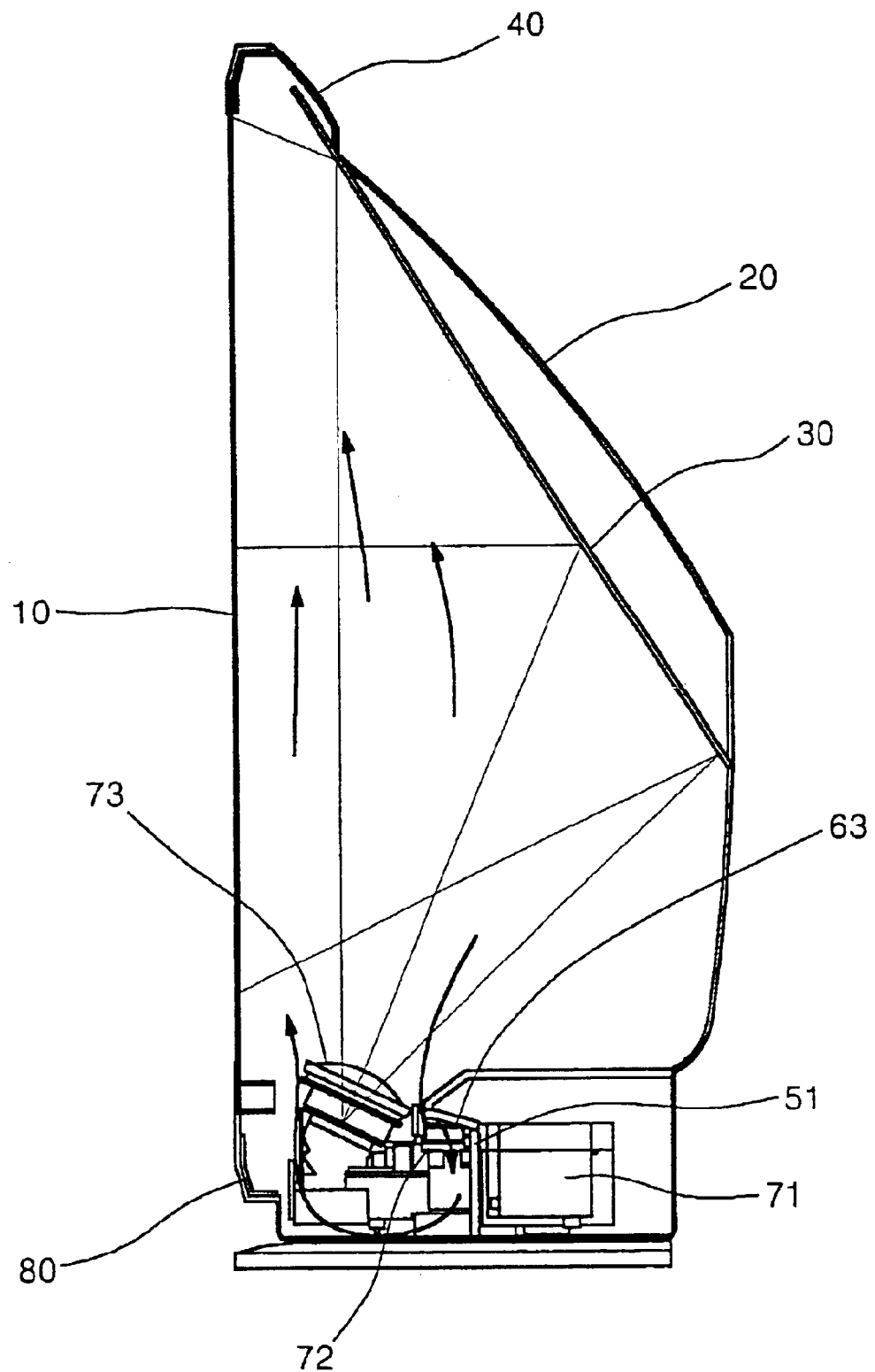
FIG. 8 is a longitudinal sectional view of a projection television in accordance with a third embodiment of the present invention.

FIG. 8 is a longitudinal sectional view of a projection television in accordance with a third embodiment of the present invention.

With reference to FIG. 8, a radial fan 63 of the third embodiment of the present invention is installed above the synthesis system 72.

Airflow into the synthesis system 72 is performed from the upper side to the lower side of the synthesis system 72. In order to achieve the air circulation, the lens system cover 52 and the heat blocking plates 53 may be properly modified in shape.

As apparent from the above description, the cooling structure for the projection television of the present invention comprises the inner space, which is sealed off from external impurities. The superheat generated by the lamp system is not transmitted to the inner space of the projection television due to the heat-blocking unit including the heat blocking ribs and the heat blocking plates.

Further, the cooling structure for the projection television of the present invention comprises the cooling fan for cooling the synthesis system or other elements, which are formed on the inner space, and the radiating holes and the heat sink, which are formed on the top of the inner space.

In accordance with the cooling structure for the projection television, the present invention achieves the dust proofing of the inner space of the projection television and the cooling of the projection television.

The image quality of the projection television is further improved by keeping the inside of the projection television clean.

The projection television with the cooling structure of the present invention is permanently used without the replacement of the elements such as the filter.

Moreover, the cooling structure for the projection television of the present invention properly corresponds to the heat capacity generated by the projection television by changing the number and the size of the radiating holes and the heat sink.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cooling structure for a projection television, said cooling structure comprising:

an optical engine assembly including a lamp system, a synthesis system, and a lens system;

a screen, a housing, and a back cover, said three elements being assembled, thereby forming an inner space;

a heat-blocking unit including heat blocking ribs and heat blocking plates, said heat-blocking ribs and said heat-blocking plates contacting the perimeter of the lamp system, thereby separating the lamp system from the inner space;

a sealing frame connected to the heat blocking unit, thereby forming a diaphragm for sealing the inner space in combination with the heat blocking unit; and a radiating unit including radiating holes for exhausting the heat of the inner space to the outside and a heat sink for covering the radiating holes and for contacting the air of inner space, said radiating holes being formed on the housing and said heat sink being thermal conductive.

2. The cooling structure for the projection television as set forth in claim 1, further comprising a sirocco fan for cooling the heat generated by the synthesis system, which is formed beneath the lens system, thereby forcibly blowing the air into the lower side of the synthesis system.

3. The cooling structure for the projection television as set forth in claim 1, further comprising a lens system cover for preventing the dust of the sealed inner space from being introduced into the synthesis system.

4. The cooling structure for the projection television as set forth in claim 1, wherein a flow hole for introducing the cooled air into the synthesis system is formed beneath the synthesis system.

5. The cooling structure for the projection television as set forth in claim 1, further comprising a radial fan for cooling the heat generated by the synthesis system, which is formed above the synthesis system, thereby blowing the air into the synthesis system.

6. The cooling structure for the projection television as set forth in claim 1, wherein said radiating holes are formed on the top of the housing.

7. A cooling structure for a projection television, said cooling structure comprising:

an optical engine assembly including a lamp system, a synthesis system, and a lens system;

a screen, a housing, and a back cover, said three elements being assembled, thereby forming an inner space;

a sealing structure for radiating the heat generated by the lamp system to the outside and for sealing the inner space except for the lamp system; and a radiating unit including radiating holes for exhausting the heat of the inner space to the outside and a heat sink for covering the radiating holes and for contacting the air of inner space, said radiating holes being formed on the housing and said heat sink being thermal conductive.

8. The cooling structure for the projection television as set forth in claim 7, further comprising a cooling fan for cooling the synthesis system, which is formed above or beneath the synthesis system.

9. The cooling structure for the projection television as set forth in claim 7, further comprising a heat blocking plate for keeping the synthesis system clean and for preventing the heat generated by the lamp system from being introduced into the inner space, said heat blocking plate being formed above the synthesis system.

10. A cooling structure for a projection television, said cooling structure comprising:

a screen, a housing, and a back cover, said three elements being assembled, thereby hermetically sealing an inner space;

a heat-blocking unit for separating a lamp system generating superheat from the sealed inner space;

a cooling fan for forcibly cooling the heat generated by the synthesis system within the sealed inner space, said cooling fan being formed adjacent to the synthesis system; and a radiating unit for exhausting the heat of the inner space to the outside, said radiating unit being formed on the upper part of the housing.

* * * * *